US012690527B2

(12) United States Patent
    Cox et al.

(10) Patent No.: US 12,690,527 B2
(45) Date of Patent: Jul. 28, 2026

(54) METHOD OF MOVING TREE AND ROOT BALL USING TREE MOVER SYSTEM

(71) Applicant: Environmental Design Intellectual Property Group, LLC, Tomball, TX (US)

(72) Inventors: Thomas P. Cox, Spring, TX (US); Mark A. Merit, The Woodlands, TX (US)

(73) Assignee: Environmental Design Intellectual Property Group, LLC, Tomball, TX (US)

( * ) Notice: Subject to any disclaimer, the term of this patent is extended or adjusted under 35 U.S.C. 154(b) by 266 days.

(21) Appl. No.: 18/664,786

(22) Filed: May 15, 2024

(65) Prior Publication Data

US 2025/0351787 A1     Nov. 20, 2025

(51) Int. Cl.
    *A01G 23/04*     (2006.01)

(52) U.S. Cl.
    CPC .................................... *A01G 23/04* (2013.01)

(58) Field of Classification Search
    CPC ...................................................... A01G 23/04
    See application file for complete search history.

(56) References Cited

U.S. PATENT DOCUMENTS

| | | |
|---|---|---|
| 328,775 A | 10/1885 | Hall |
| 783,241 A | 2/1905 | Bisset |
| 2,714,011 A | 7/1955 | Albee |
| 4,305,213 A | 12/1981 | Pelham |
| 6,253,690 B1 | 7/2001 | Cox |
| 6,530,333 B1 | 3/2003 | Cox |
| 7,658,157 B2 | 2/2010 | Cox et al. |
| 8,844,449 B2 * | 9/2014 | Merit .................. A01G 23/046 |
| | | 414/23 |

FOREIGN PATENT DOCUMENTS

| | | | | |
|---|---|---|---|---|
| CN | 108909976 A | * | 11/2018 | ............... B63C 3/12 |
| KR | 100940795 B1 | * | 2/2010 | ............. B63B 35/66 |

OTHER PUBLICATIONS

International Search Report and the Written Opinion of the International Searching Authority; (ISA) International Searching Authority, Aug. 1, 2013.

* cited by examiner

*Primary Examiner* — Matthew R Buck
(74) *Attorney, Agent, or Firm* — Patrick K. Steele

(57)     ABSTRACT

A method of altering the pathway of movement of a tree, a root ball and a platform supporting the root ball that are together being moved using inflatable airbags includes the steps of positioning an additional airbag at partially within the pathway of movement of the root ball on the airbags, the additional airbag being placed at an acute angle to the leading airbag of the plurality of airbags supporting the root ball, and then by applying an off-center force to the root ball that both translates the airbag forward within the pathway of movement and also imparts a turning moment to the root ball to move the root ball in a new direction that enables the additional airbag to support the leading edge of the platform. The steps can be repeated to further turn the pathway of movement of the root ball, tree and platform.

4 Claims, 7 Drawing Sheets

METHOD OF MOVING TREE AND ROOT BALL USING TREE MOVER SYSTEM

BACKGROUND

Field of the Invention

The present invention relates to a method of using equipment and a system for moving live trees with a root ball, and more particularly for moving large trees and for controllably altering the direction of movement of the tree and root ball. The method and system of the present invention utilizes inflatable airbags to elevate the root ball and to roll the root ball over a ground surface, and to controllably alter the direction of travel to deliver the tree and root ball to a targeted location.

Background of the Related Art

U.S. Pat. No. 8,844,449 granted to the present applicant discloses a tree mover system with airbags. The entirety of that patent is incorporated by reference herein. That patent discloses a system and method for moving a large tree with an intact root ball over ground using inflatable airbags.

BRIEF SUMMARY

An embodiment of the method of the present invention for moving a tree comprises the steps of forming a trench around the circumference of the tree, the trench defining a perimeter of a root ball in which the tree is earthed and supported, inserting a plurality of elongate, substantially parallel supports under the root ball, each support extending between opposing sides of the root ball, and then positioning two or more connecting beams over the plurality of supports, each connecting beam connected to each of the plurality of supports to form a substantially rigid platform underneath the root ball and the tree. The embodiment of the method of the present invention then further comprises the steps of inserting a plurality of inflatable, elongate bags underneath the plurality of supports, the plurality of inflatable, elongate bags each having an axis and the plurality of inflatable, elongate airbags being arranged in a parallel series. The embodiment of the method of the present invention then further comprises the steps of inflating the plurality of airbags to raise the plurality of supports and the root ball and the tree supported thereon, and then moving the platform, the root ball and the tree in a first, linear pathway using the plurality of inflated airbags to engage the plurality of supports, and by rolling the root ball over the plurality of inflatable airbags in the parallel series.

At this juncture, the embodiment of the method of the present invention is disclosed in U.S. Pat. No. 8,844,449 (hereinafter referred to as "the '449 Patent") granted to the applicant. Embodiments of the method of the present invention are directed to turning the pathway of the platform, tree and root ball supported on a plurality of inflated airbags to move the platform, tree and root ball in a new pathway having a different direction.

The embodiment of the method of the present invention include the steps of positioning an additional inflated, elongate airbag with at least a portion of the additional, inflated airbag being within the first, linear pathway of the platform, tree and root ball being moved using an embodiment of the method disclosed in the '449 Patent, and with a first end of the additional, inflated airbag being at a first distance from a first end of a proximal airbag of the plurality of inflated airbags of the parallel series and a second end of the additional, inflated airbag being at a second distance, that is greater than the first distance, from a second end of the proximal airbag of the plurality of inflated airbags. The embodiment of the method of the present invention further includes the step of strategically applying an off-center force to the platform and/or the root ball, the off-center force having two components: one component to translate the platform, tree and root ball in the direction of the pathway in which the platform, tree and root ball are being moved, and another component to impart a moment to the platform, tree and root ball tending to rotate the platform, tree and root ball in a desired angular direction (clockwise or counterclockwise, from a plan view perspective). The embodiment of the method of the present invention further comprises the steps of translating and rotating the platform, tree and root ball to position a leading portion of the platform on the additional, inflated airbag. Further translation and rotation of the platform, tree and root ball will increase the size of the portion of the platform that is supported on the additional, inflated airbag, and it will position the leading edge of the platform into alignment with the axis of the additional, inflated airbag onto which the leading edge of the platform is supported.

From this arrangement, additional inflated airbags can be disposed into the now altered pathway of movement of the platform with the axes of the additional inflated airbags being in a parallel relationship with the axis of the first additional inflated airbag to enable the platform to be moved further in the new, altered pathway. Alternately, should further turning of the platform pathway be required, a second additional airbag can be disposed, similar to the first additional airbag, with the first end of the second additional airbag at a first distance from the first end of the first additional airbag and the second end of the second additional airbag being disposed as a second distance, that is greater than the first distance, from the second end of the first additional airbag. Application of a strategically placed off-center force proximal to the second edge of the platform will result in further translation of the platform in the direction of the altered pathway and further rotation of the platform to move a portion of the leading edge of the platform onto the second inflated airbag while, at the same time, moving a greater portion of the platform onto the increasingly loaded first additional airbag. The force applied to move the platform may be far off-center such as, for example, near the periphery of the platform, for a sharper turning of the pathway of movement or it may be applied intermediate the periphery and the tree for a more gradual turning of the pathway of movement. This method of introducing more additional airbags at an acute angle to the most recently introduced airbag will continue to alter the pathway of movement of the platform until the desired amount of turning of the pathway has been achieved, at which point additional airbags introduced thereafter will be placed with each axis in alignment with the recently loaded airbag to straighten the pathway of movement.

The method described above can be better understood by the detailed description of the drawings that follows. As the trailing edge of the platform is removed from the trailing airbag, that unloaded, trailing airbag can be repositioned as an additional inflated airbag in the pathway of the platform as it continues to move in the altered pathway. Although the heavy equipment used to apply the off-center force to the platform is shown in the appended drawings discussed below to be applied as a pulling force, it will be understood that the off-center force could also be applied from the rear to produce the same results. However, application of the off-center force to the leading edge of the platform may provide better control of movement of the platform.

DETAILED DESCRIPTION

Figure 1:
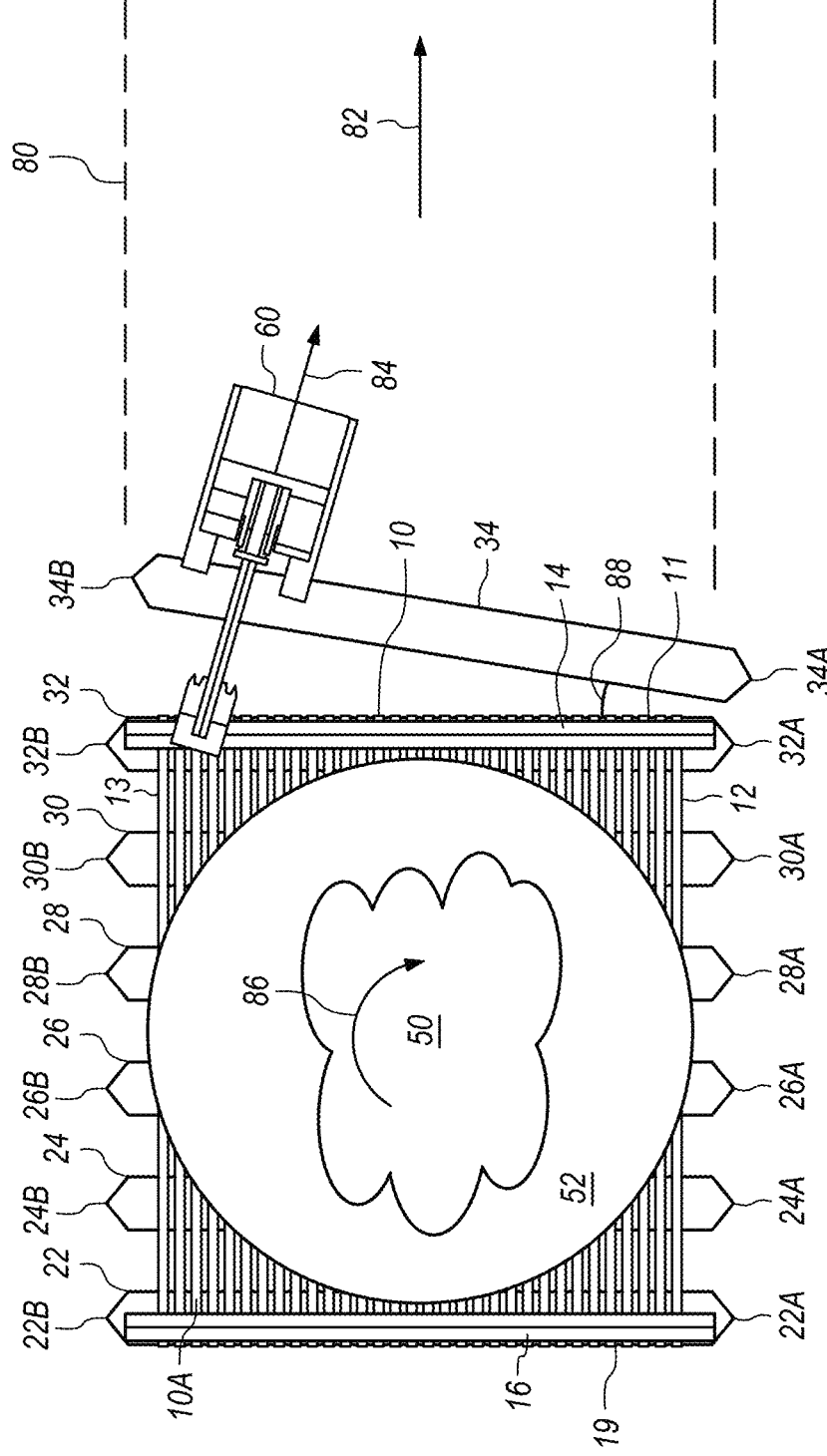
FIG. 1 is a plan view of a tree with root ball supported on a platform that is movably supported on a plurality of parallel, inflated airbags and a first additional inflated airbag positioned in the pathway of movement of and at an angle to a leading end of the platform in accordance with a step of an embodiment of the method of the present invention.

FIG. 1 is a plan view of a tree 50 with root ball 52 supported on a platform 10 that is movably supported on a plurality of parallel, inflated airbags 22, 24, 26, 28, 30 and 32. A first additional inflated airbag 34 is positioned in the pathway 80 of movement of and at an angle 88 to a leading end 11 of the platform 10 in accordance with a step of an embodiment of the method of the present invention. The platform 10 is constructed in the manner disclosed in the '449 Patent and the airbags 22, 24, 26, 28, 30 and 32 are disposed underneath the platform 10 as disclosed in U.S.

Pat. No. 8,844,449 (hereinafter referred to as "the '449 Patent"). The platform 10 includes a leading edge 11, a trailing edge 19, a first edge 12 and a second edge 13. As disclosed in the '449 Patent, the platform 10 may be comprised of a plurality of elongate tubular pipes 10A secured in their generally parallel and spaced apart relationship one to the others by connection to a leading beam 14 and a trailing beam 16. Movement of the platform 10 shown in FIG. 1 is originally in the direction of arrow 82 and the platform 10 is moving on and supported by the inflated airbags 22, 24, 26, 28, 30 and 32.

The airbags 22, 24, 26, 28, 30 and 32 include first ends 22A, 24A, 26A, 28A, 30A and 32A and second ends 22B, 24B, 26B, 28B, 30B and 32B, and the first additional airbag 34 that is positioned in the pathway 80 of movement includes a first end 34A and a second end 34B. The first additional airbag 34 is, in FIG. 1, unloaded and positioned to receive a portion of the leading edge 11 of the platform 10 that is proximal to the first end 34A of the first additional airbag 34. The first end 34A of the first additional airbag 34 is disposed at a first distance from the first end 32A of the leading airbag 32 of the plurality of airbags 22, 24, 26, 28, 30 and 32 that support the platform 10, and the second end 34B of the first additional airbag 34 is disposed at a second distance, that is greater than the first distance, from the second end 32B of the leading airbag 32 of the plurality of airbags 22, 24, 26, 28, 30 and 32 that support the platform 10. This positioning of the first additional airbag 34 creates an angle 88 between the first additional airbag 34 and the leading airbag 32 of the plurality of airbags 22, 24, 26, 28, 30 and 32 that movably support the platform 10.

The pathway 80 of movement can be turned in the direction of the first end 34A of the first additional airbag 34 by application of an off-center force to roll the platform 10 on the plurality of airbags 22, 24, 26, 28, 30 and 32 that support the platform 10 and towards the first end 34A of the first additional airbag 34. The off-center force may be applied by heavy equipment such as, for example, the track hoe 60 shown in FIG. 1. The off-center force is applied using the track hoe 60 at a location on the platform 10 that is proximal to the second edge 13 and proximal to the leading edge 14 of the platform 10 and in the direction of arrow 84. This application of force applied at this location on the platform 10 moves the platform 10 in the direction of arrow 82 and simultaneously imparts a moment tending to rotate the platform 10 in a clockwise direction (as viewed from above as shown in the plan view of FIG. 1) as indicated by arrow 86. Movement of the platform 10 by the off-center force applied in this manner results in the platform 10 being moved to the position indicated in FIG. 2.

Figure 2:
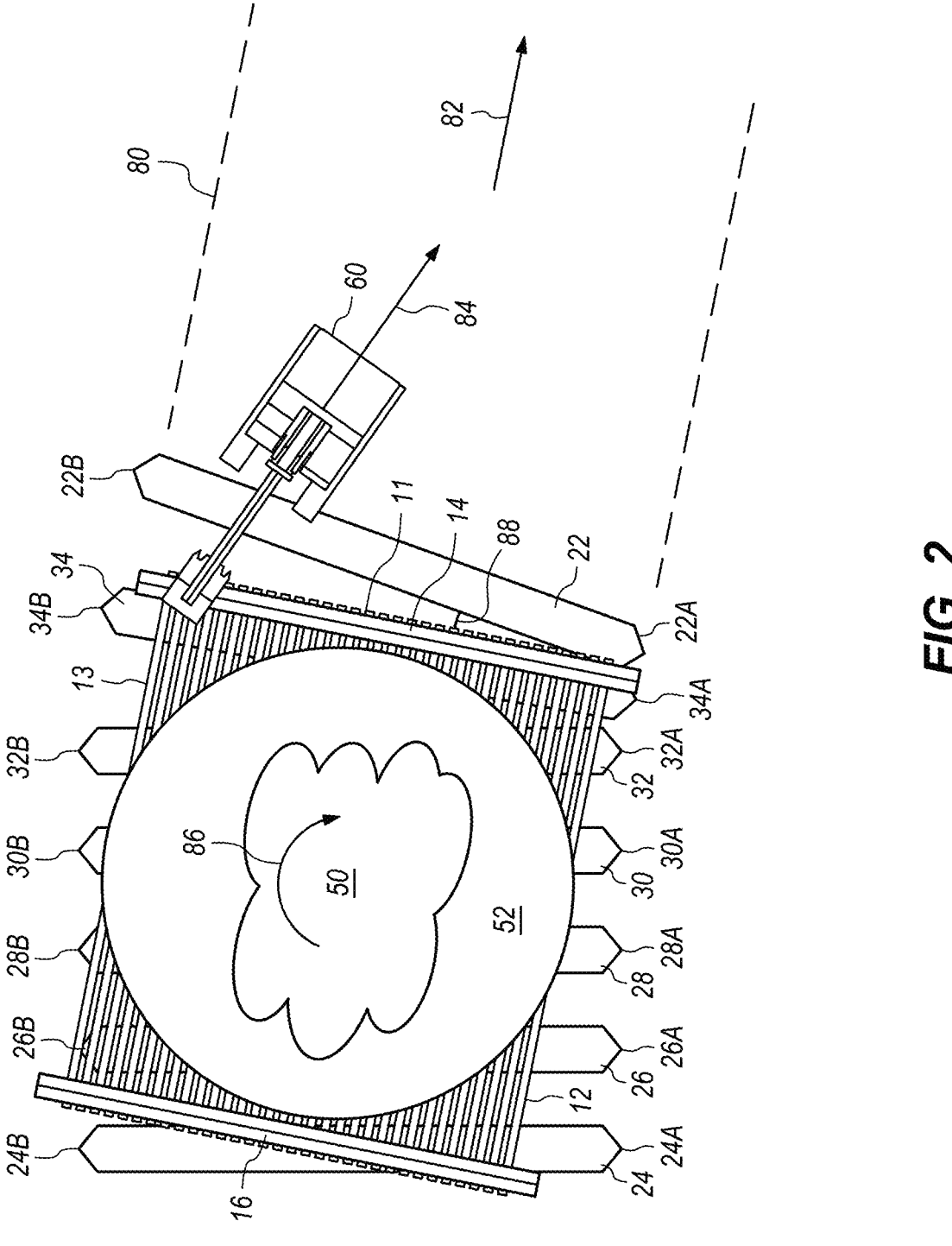
FIG. 2 is the plan view of FIG. 1 after the platform, and the tree and the root ball supported on the platform, are pulled towards the first additional inflated airbag positioned adjacent to the leading end of the platform, the off-center pulling force being applied proximal to a second edge of the platform and proximal to a leading end of the platform to displace the platform in the direction of the first additional airbag and to simultaneously rotate the platform clockwise, thereby altering the pathway of movement of the platform in the direction of the first end of the first additional airbag.

FIG. 2 is the plan view of FIG. 1 after the platform 10, and the tree 50 and the root ball 52 supported on the platform 10, is pulled towards and then onto the first additional airbag 34 now shown as being disposed underneath the leading edge 11 of the platform 10. The pulling force being applied by the track hoe 60 is applied proximal to a second edge 13 of the platform 10 and proximal to a leading edge 14 of the platform 10 to displace the platform 10 in the direction of the first additional airbag 34 and to rotate the platform 10 clockwise, thereby altering the pathway of movement of the platform 10 in the direction of the first end 34A of the first additional airbag 34. The trailing airbag 22 shown underneath the trailing edge 19 of the platform in FIG. 1 has, as a result of the movement of the platform 10 from the position illustrated in FIG. 1 to the position illustrated in FIG. 2, become unloaded. That trailing airbag 22 shown in FIG. 1 has, after becoming unloaded as the platform 10 moves to the new position illustrated in FIG. 2, been repositioned within the now-modified pathway 80 as shown in FIG. 2 and is now the second additional airbag 22. Also, as shown in FIG. 2, the platform 10 is supported by the plurality of airbags 24, 26, 28, 30, 32 and 34, and the first additional airbag 34 of FIG. 1 has become the new leading airbag 34 as illustrated in FIG. 2. As with the step of positioning the first additional airbag 34 as illustrated in FIG. 1, the second additional airbag 22 (formerly the trailing airbag 22 of FIG. 1) is positioned within the pathway 80 of movement with the first end 22A of the second additional airbag 22 disposed at a first distance from the first end 34A of the leading airbag 34 and the second end 22B of the second additional airbag 22 disposed at a second distance, that is greater than the first distance, from the second end 34B of the leading airbag 34. This positioning creates an angle 88 between the second additional airbag 22 and the leading airbag 34.

Figure 3:
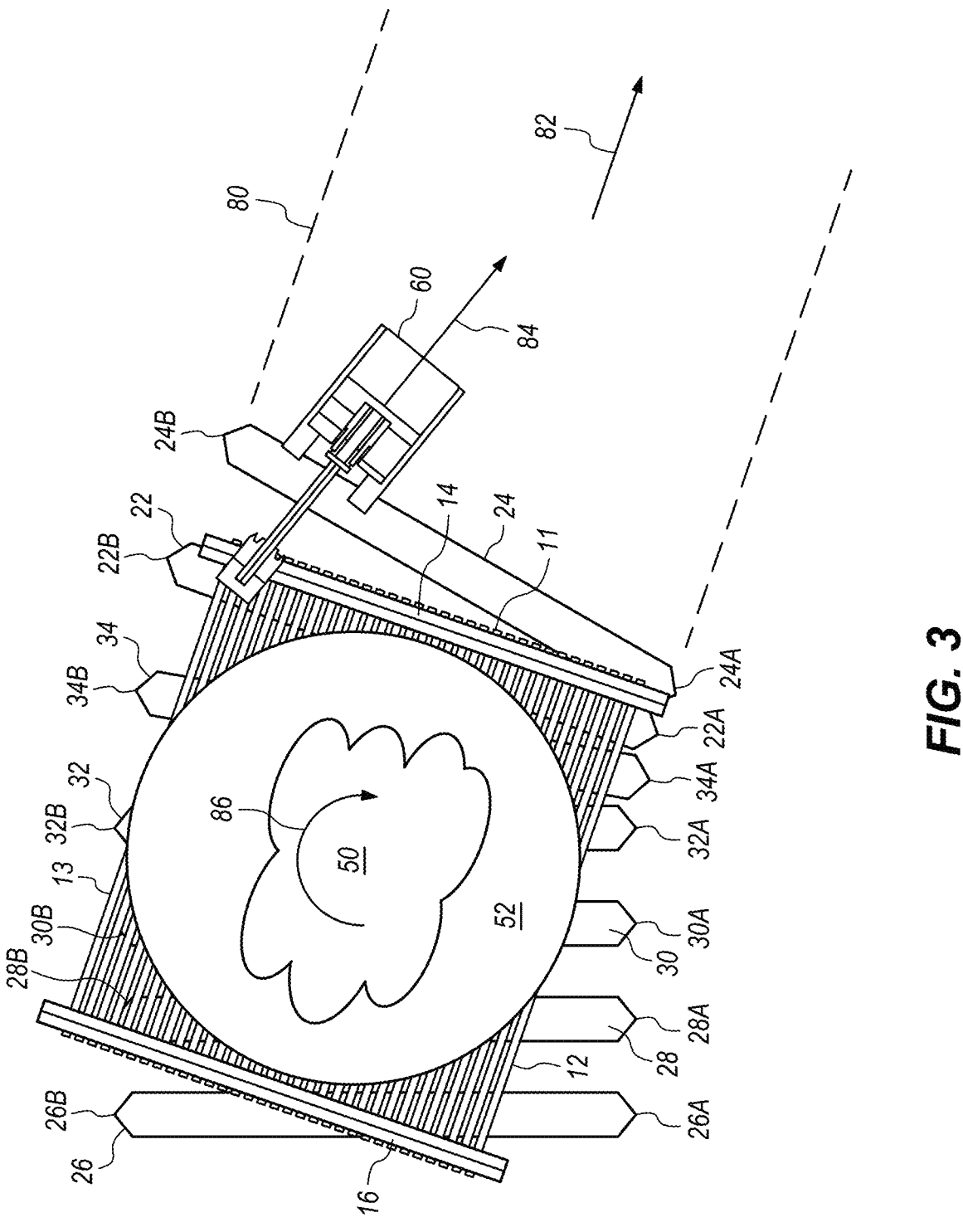
FIG. 3 is the plan view of FIG. 2 after a second, additional inflated airbag is positioned in the pathway of movement of platform and adjacent to the first additional inflated airbag, and the platform is pulled towards the second additional airbag.

FIG. 3 is the plan view of FIG. 2 after the platform 10 is moved to load the second additional airbag 22 and to dispose the second additional airbag 22 beneath the leading edge 11 of the platform 10. A third additional airbag 24, formerly the trailing airbag 24 as illustrated in FIG. 2, has become unloaded and is shown in FIG. 3 as having been repositioned in the pathway 80 of movement of platform 10 and adjacent to and at an angle 88 to the leading airbag 22 (formerly the second additional airbag 22), and the platform 10 is illustrated as being pulled by the track hoe 60 towards the third additional airbag 24. The leading edge 11 of the platform 10 is shown in FIG. 3 as being supported on a small portion of the third additional airbag 24 that is proximal to the first end 24A of the third additional airbag 24. An off-center force continues to be applied by the track hoe 60 to the leading edge 11 of the platform 10 at a location that is proximal to the second edge 13 of the platform 10 to pull the platform 10 towards the third additional airbag 24 and to apply a moment to the platform 10 tending to rotate the platform 10 as indicated by the arrow 86. It can be seen in FIG. 3 that further movement of the platform 10 in the direction of arrow 82 will result in the trailing airbag 26 becoming unloaded and available for re-positioning.

Figure 4:
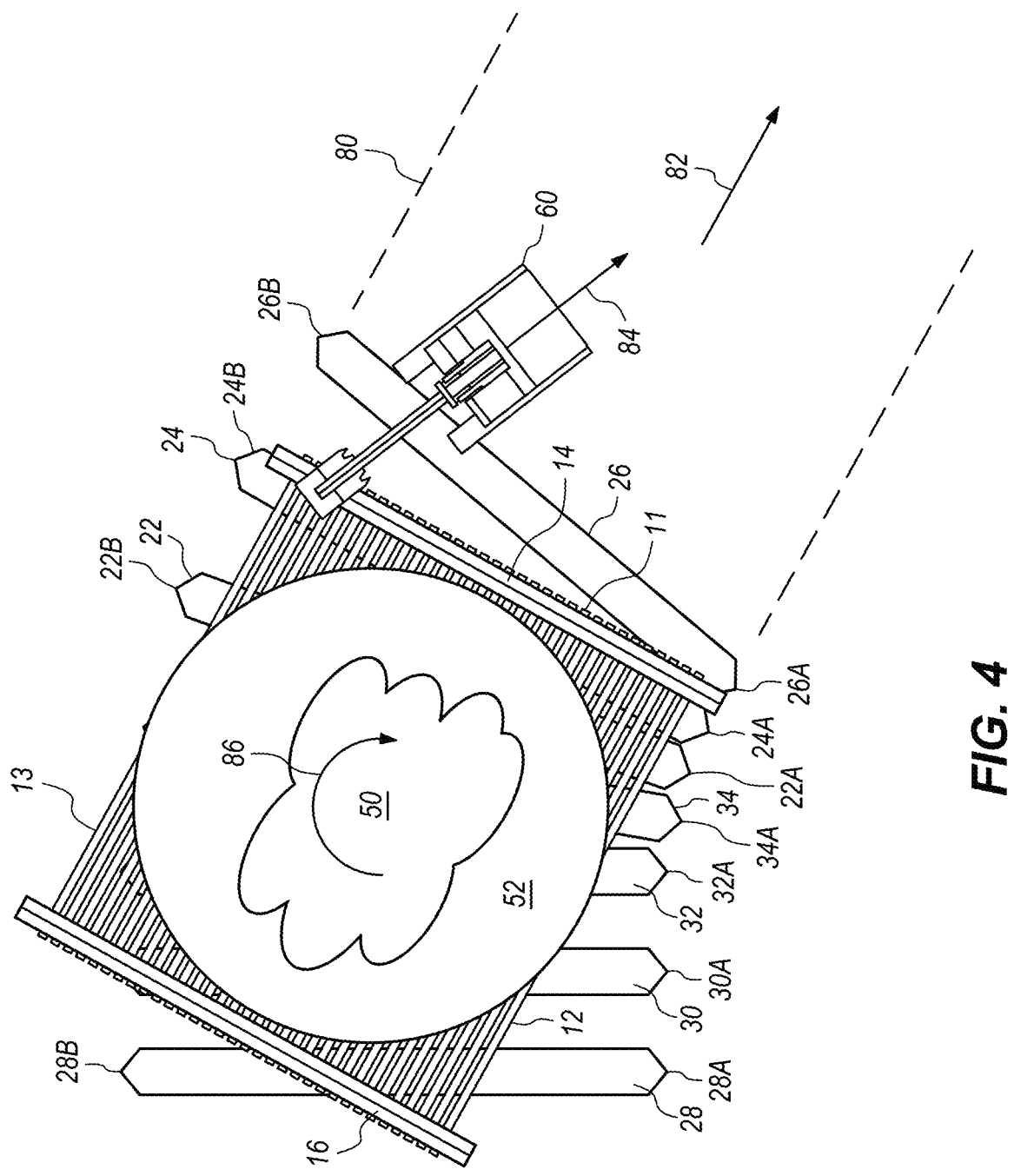
FIG. 4 is the plan view of FIG. 3 after the platform, the tree and the root ball supported on the platform is pulled towards the second additional, inflated airbag positioned adjacent to the first additional inflated airbag and the leading edge of the platform, thereby rotating the platform further to turn the pathway of movement of the platform in the direction of the first end of the second additional, inflated airbag in accordance with a third subsequent step of an embodiment of the method of the present invention.

FIG. 4 is the plan view of FIG. 3 after the platform 10, and the tree 50 and the root ball 52 supported on the platform 10, is pulled towards the fourth additional airbag 26 (formerly the trailing airbag 26 shown in FIG. 3) positioned adjacent to the leading airbag 24 (formerly the third additional airbag 24 shown in FIG. 3) and the leading edge 11 of the platform 10. The off-center force applied by the track hoe 60 to the platform 10 simultaneously imparts a moment to the platform 10 tending to rotate the platform 10 in a clockwise direction as indicated by arrow 86. This movement of the platform 10 turns the pathway 80 of movement of platform 10 in the direction of the first end 26A of the fourth additional airbag 26. It can be seen in FIG. 4 that further movement of the platform 10 in the direction of arrow 82 will result in the trailing airbag 28 becoming unloaded and available for re-positioning.

Figure 5:
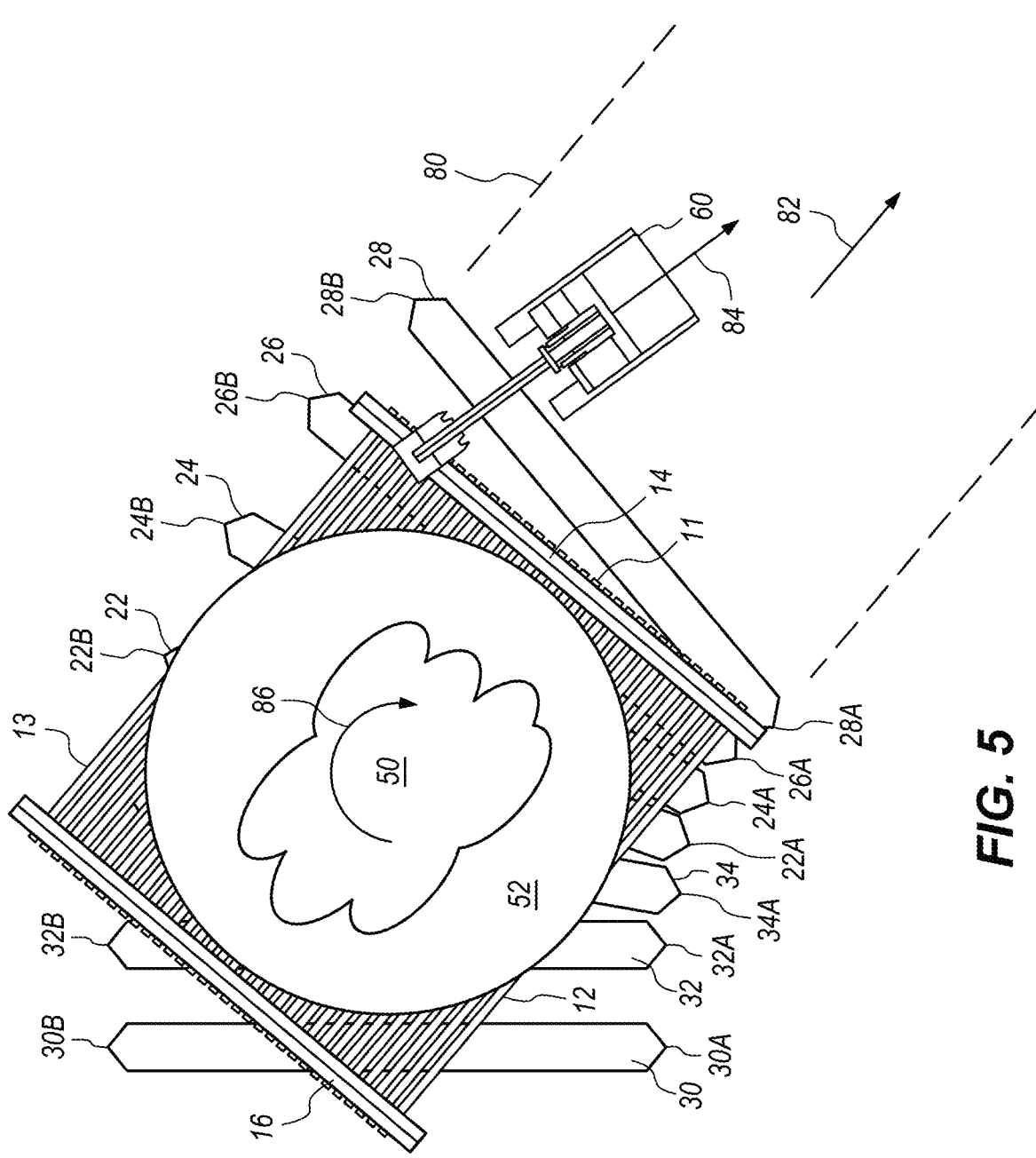
FIG. 5 is the plan view of FIG. 4 after the platform, and the tree and the root ball supported on the platform, is pulled towards the fifth additional airbag (formerly the trailing airbag shown in FIG. 4) positioned adjacent to the leading airbag (formerly the fourth additional airbag shown in FIG. 4) and the leading edge of the platform.

FIG. 5 is the plan view of FIG. 4 after the platform 10, and the tree 50 and the root ball 52 supported on the platform 10, is pulled towards the fifth additional airbag 28 (formerly the trailing airbag 28 shown in FIG. 4) positioned adjacent to the leading airbag 26 (formerly the fourth additional airbag 26 shown in FIG. 4) and the leading edge 11 of the platform 10. The off-center force applied by the track hoe 60 to the platform 10 simultaneously imparts a moment to the platform 10 tending to rotate the platform 10 in a clockwise direction as indicated by arrow 86. This movement of the platform 10 turns the pathway 80 of movement of the platform 10 in the direction of the first end 28A of the fifth additional airbag 28. It can be seen in FIG. 5 that further movement of the platform 10 in the direction of arrow 82 will result in the trailing airbag 30 becoming unloaded and available for re-positioning.

Figure 6:
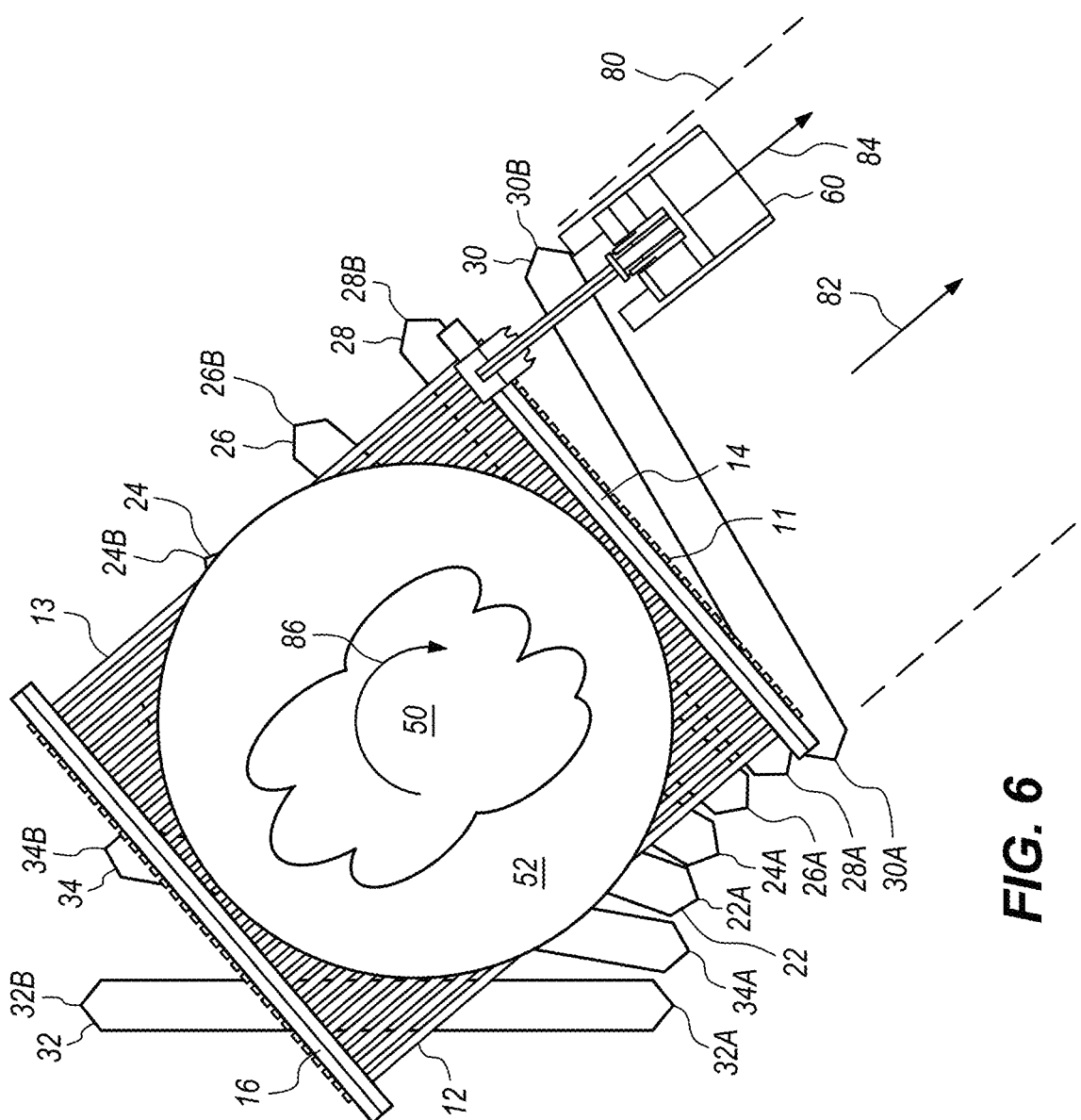
FIG. 6 is the plan view of FIG. 5 after the platform, and the tree and the root ball supported on the platform, is pulled towards the sixth additional airbag (formerly the trailing airbag shown in FIG. 5) positioned adjacent to the leading airbag (formerly the fifth additional airbag shown in FIG. 5) and the leading edge of the platform.

FIG. 6 is the plan view of FIG. 5 after the platform 10, and the tree 50 and the root ball 52 supported on the platform 10, is pulled towards the sixth additional airbag 30 (formerly the trailing airbag 30 shown in FIG. 5) positioned adjacent to the leading airbag 28 (formerly the fifth additional airbag 28 shown in FIG. 5) and the leading edge 11 of the platform 10. The off-center force applied by the track hoe 60 to the platform 10 simultaneously imparts a moment to the platform 10 tending to rotate the platform 10 in a clockwise direction as indicated by arrow 86. This movement of the platform 10 turns the pathway 80 of movement of the platform 10 in the direction of the first end 28A of the fifth additional airbag 28. It can be seen in FIG. 6 that further movement of the platform 10 in the direction of arrow 82 will result in the trailing airbag 32 becoming unloaded and available for re-positioning.

Figure 7:
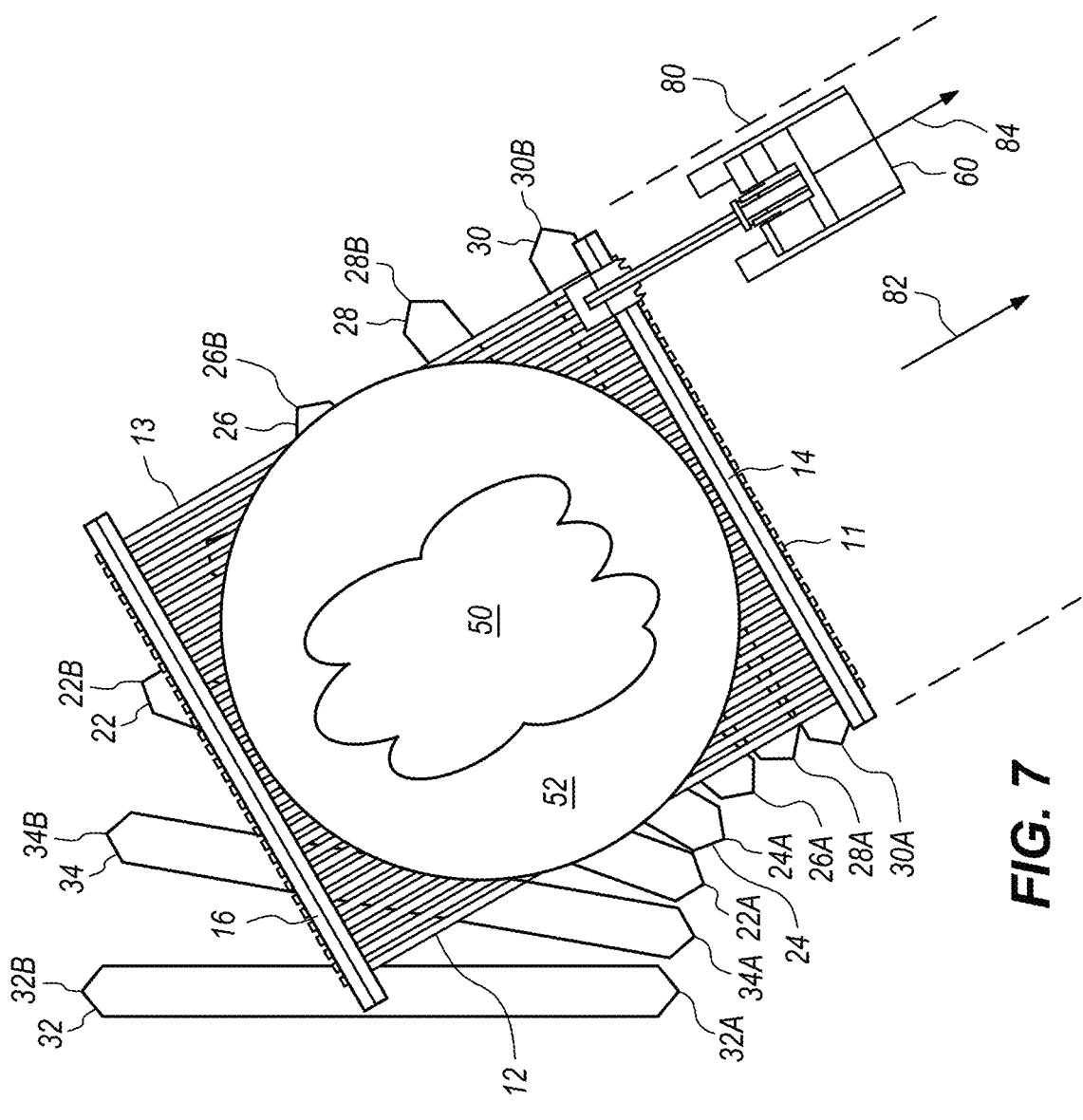
FIG. 7 is the plan view of FIG. 6 after the platform, and the tree and the root ball supported on the platform, is pulled further onto the sixth additional airbag to load the sixth additional airbag and to dispose it beneath the leading edge of the platform.

FIG. 7 is the plan view of FIG. 6 after the platform 10, and the tree 50 and the root ball 52 supported on the platform 10, is pulled further onto the sixth additional airbag 30 to load the sixth additional airbag 30 and to dispose it beneath the leading edge 11 of the platform 10. It can be seen in FIG. 7 that further movement of the platform 10 in the direction of arrow 82 will result in the trailing airbag 32 becoming unloaded and available for re-positioning, should further turning of the platform 10 be desired. The steps of an embodiment of the method of the present invention illustrated in FIGS. 1-7 can be used to continue to turn the platform 10 towards the right, or additional airbags may be positioned in the pathway 80 of movement in a generally parallel relationship with the leading edge 11 of the platform 10 and in a generally parallel relationship with the leading airbag 30 (formerly the sixth additional airbag 30 of FIG. 6) to terminate the turning of the pathway 80 of movement and to move the platform 10 in a new segment of straight ahead movement.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of moving a tree, comprising:

forming a trench around a circumference of the tree, the trench defining a perimeter of a root ball;

inserting a plurality of elongate, substantially parallel supports under the root ball, each support extending between opposing sides of the root ball;

positioning two or more connecting beams over the plurality of supports, each connecting beam connected to each of the plurality of supports to form a substantially rigid platform;

inserting a plurality of inflatable, elongate bags under the plurality of supports, the plurality of inflatable, elongate bags each having an axis and the plurality of inflatable, elongate airbags being arranged in a parallel series;

inflating the plurality of airbags to raise the plurality of supports and the root ball;

moving the root ball in a first, linear pathway using the plurality of inflated airbags to engage the plurality of supports and by rolling the root ball over the plurality of inflatable airbags in the parallel series;

positioning an additional airbag with at least a portion of the additional airbag being within the first, linear pathway and with a first end of the additional airbag being at a first distance from a first end of a proximal airbag of the plurality of airbags of the parallel series and a second end of the additional airbag being at a second distance, that is greater than the first distance, from a second end of the proximal airbag of the plurality of airbags; and continuing to move the root ball in the direction of the first, linear pathway until a leading portion of the platform is supported on the additional, inflated airbag;

wherein an angle formed between an axis of the additional airbag supporting the leading portion of the platform and the proximal airbag of the plurality of airbags causes a turn of the pathway of movement of the platform in the direction of the first end of the additional airbag by application of an off-center force.

2. The method of claim 1, wherein the angle formed between the additional airbag and the proximal airbag of the plurality of airbags supporting the tree, root ball and platform is an acute angle.

3. The method of claim 1, wherein the off-center force applied to turn the root ball can be applied near a periphery of the root ball for a sharper turning of the pathway of movement.

4. The method of claim 1, wherein the off-center force applied to turn the root ball can be applied intermediate the tree and a periphery of the root ball for a gradual turning of the pathway of movement.

* * * * *